United States Patent
Kenney et al.

(10) Patent No.: US 11,294,672 B2
(45) Date of Patent: Apr. 5, 2022

(54) ROUTING CIRCUITRY FOR PERMUTATION OF SINGLE-INSTRUCTION MULTIPLE-DATA OPERANDS

(71) Applicant: Apple Inc., Cupertino, CA (US)

(72) Inventors: Robert D. Kenney, Austin, TX (US); Liang-Kai Wang, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/548,812

(22) Filed: Aug. 22, 2019

(65) Prior Publication Data
US 2021/0055931 A1    Feb. 25, 2021

(51) Int. Cl.
 *G06F 9/30* (2018.01)
 *G06F 9/38* (2018.01)
 *G06F 9/54* (2006.01)

(52) U.S. Cl.
 CPC ........ *G06F 9/30032* (2013.01); *G06F 9/3867* (2013.01); *G06F 9/3887* (2013.01); *G06F 9/542* (2013.01)

(58) Field of Classification Search
 None
 See application file for complete search history.

(56) References Cited

U.S. PATENT DOCUMENTS

| | | | |
|---|---|---|---|
| 6,272,616 B1 | 8/2001 | Fernando et al. | |
| 6,643,763 B1 | 11/2003 | Starke et al. | |
| 8,074,051 B2 | 12/2011 | Hokenek et al. | |
| 8,248,422 B2 | 8/2012 | Mejdrich et al. | |
| 9,304,775 B1 | 4/2016 | Lindholm et al. | |
| 9,389,869 B2 | 7/2016 | Tran | |
| 9,519,944 B2 | 12/2016 | Goodman et al. | |
| 9,600,288 B1 | 3/2017 | Potter et al. | |
| 9,672,043 B2 | 6/2017 | Eisen et al. | |
| 9,830,156 B2 | 11/2017 | Krashinsky | |
| 10,061,591 B2 | 8/2018 | Beylin et al. | |

(Continued)

OTHER PUBLICATIONS

International Search Report and Written Opinion in Appl. No. PCT/US2020/044767 dated Nov. 6, 2020, 13 pages.

*Primary Examiner* — Corey S Faherty
(74) *Attorney, Agent, or Firm* — Kowert, Hood, Munyon, Rankin & Goetzel, P.C.; Michael B. Davis

(57) ABSTRACT

Techniques are disclosed relating to routing circuitry configured to perform permute operations for operands of threads in a single-instruction multiple-data group. In some embodiments, an apparatus includes hierarchical operand routing circuitry configured to route operands between a set of single-instruction multiple-data (SIMD) pipelines based on a permute instruction. In some embodiments, the routing circuitry includes a first level and a second level. The first level may include a set of multiple crossbar circuits each configured to receive operands from a respective subset of the pipelines and output one or more of the received operands on multiple output lines based on the permute instruction, where the crossbar circuits support full permutation within a respective subset. A second level may be configured to select an operand from a previous level for each of the pipelines, and may select from among only a portion of output operands from the previous level to provide an operand for a respective pipeline.

20 Claims, 8 Drawing Sheets

(56) References Cited

U.S. PATENT DOCUMENTS

| | | |
|---|---|---|
| 10,261,835 B2 | 4/2019 | Joao et al. |
| 10,296,333 B2 | 5/2019 | Rubinstein et al. |
| 10,459,723 B2 * | 10/2019 | Mahurin .............. G06F 9/30032 |
| 2005/0286633 A1 | 12/2005 | Abel et al. |
| 2006/0179274 A1 | 8/2006 | Jones et al. |
| 2006/0179283 A1 | 8/2006 | Jensen |
| 2006/0179439 A1 | 8/2006 | Jones et al. |
| 2008/0148009 A1 | 6/2008 | Doerr et al. |
| 2008/0263552 A1 | 10/2008 | Takagi |
| 2009/0063608 A1 | 3/2009 | Mejdrich et al. |
| 2009/0254736 A1 * | 10/2009 | Symes ................ G06F 9/30032 712/225 |
| 2012/0079503 A1 | 3/2012 | Dally et al. |
| 2013/0339649 A1 | 12/2013 | Hsu et al. |
| 2014/0122551 A1 | 5/2014 | Dogon et al. |
| 2015/0089202 A1 | 3/2015 | Qiu |
| 2017/0032488 A1 | 2/2017 | Nystad |
| 2018/0018299 A1 | 1/2018 | Han et al. |
| 2018/0203701 A1 | 1/2018 | Nield |
| 2018/0089090 A1 | 3/2018 | Havlir et al. |
| 2018/0217844 A1 | 8/2018 | Kalamatianos et al. |
| 2019/0004807 A1 | 1/2019 | Chen et al. |
| 2019/0004814 A1 | 1/2019 | Chen et al. |
| 2019/0108068 A1 | 4/2019 | Britkin et al. |
| 2019/0132603 A1 | 5/2019 | Surti et al. |
| 2019/0139182 A1 | 5/2019 | Nurvitadhi et al. |
| 2019/0199370 A1 | 6/2019 | Madduri et al. |

\* cited by examiner

Example routing for shift up by five:

Example routing for butterfly by the number of threads minus one:

Route operands between ones of a set of single-instruction multiple-data (SIMD) pipelines based on a permute instruction
510

Receive, by each of multiple crossbar circuits in a first level of the hierarchical operand routing circuitry, operands from a respective subset of the pipelines and output one or more of the received operands on multiple output lines based on the permute instruction, where the crossbar circuits each support full permutation of their inputs
520

Select, by circuitry in a second level of the hierarchical operand routing circuitry, an operand from a previous level for each of the pipelines, where the selection is from among only a portion of output operands from the previous level to provide an operand for a respective pipeline
530

*FIG. 5*

ROUTING CIRCUITRY FOR PERMUTATION OF SINGLE-INSTRUCTION MULTIPLE-DATA OPERANDS

BACKGROUND

Technical Field

This disclosure relates generally to processor architecture and more particularly to circuitry configured to permute operands among single-instruction multiple-data (SIMD) threads.

Description of the Related Art

Many processors execute instructions using SIMD architectures (which may also be referred to as single instruction multiple thread (SIMT) architectures) in which a given operation is specified for a set of multiple threads that perform the operation on potentially different input data. Traditionally, private thread data was not shared among threads in SIMD architectures, e.g., each thread operated on its private operands and did not share data with other threads. In some contexts such as graphics processors, operands are now shared among certain threads, e.g., to perform gradient operations. Other types of permutations may be useful in various contexts, e.g., in parallel processing for artificial intelligence and computer learning.

BRIEF DESCRIPTION OF THE DRAWINGS

FIG. 5 is a flow diagram illustrating a method for executing a permute instruction using multi-level routing circuitry, according to some embodiments.

Figure 1A:
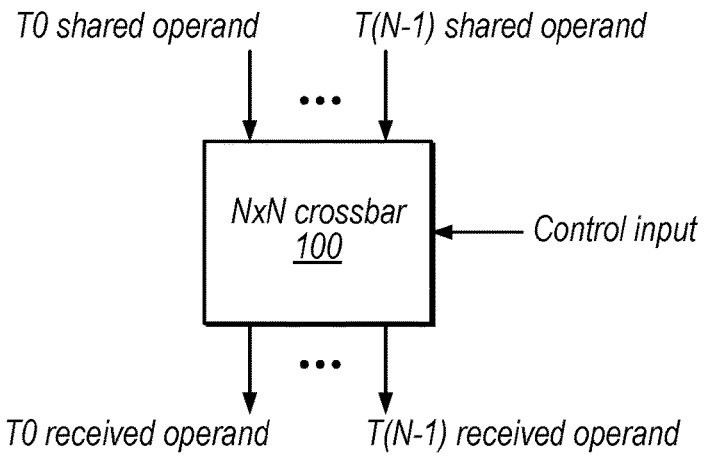
FIG. 1A is a block diagram illustrating an example N by N crossbar.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "multiplexer configured to select an value to output from among multiple inputs" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Hierarchical Routing Circuitry

Various types of computer processors may include sets of pipelines configured to execute SIMD instructions in parallel. For example, graphics processors often include programmable shader cores that are configured to execute instructions for a set of related threads in a SIMD fashion. In some embodiments, each thread is assigned to a hardware pipeline that fetches operands for that thread and performs the specified operations in parallel with other pipelines for the set of threads. The group of threads may be referred to as a SIMD group, a wavefront, a clique, or a warp, for example. Note that processors may have a large number of shader pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, the processor shares operands among threads for certain operations. For example, for gradient operations, operands may be shared among threads in a 2×2 quad of threads. For example, a 4×4 crossbar may be used to route operands among these threads according to any desired permutation of operands for the four threads. Circuitry configured to receive multiple inputs and provide multiple outputs with any of the inputs being routed to any of the outputs is referred to herein as supporting "full permutation" of inputs. FIG. 1A is a block diagram illustrating an N×N crossbar configured to receive inputs from N threads T0 through T(N−1) and output operands to the N threads according to any permutation specified by the control input. The crossbar of FIG. 1A is one example of routing circuitry that supports full permutation of inputs. For operand sharing among threads of larger SIMD group sizes, however, routing circuitry such as crossbars that support full permutation may require substantial processor area and consume considerable amounts of power.

Therefore, in some embodiments, hierarchical routing circuitry is configured to perform only a subset of a full set of permutations. The subset may include commonly-used permutations, while full permutation support may be achieved by performing multiple permutation operations using the hierarchical routing circuitry. In various embodiments, the disclosed techniques may reduce area or power consumption of routing circuitry for routing operands among SIMD threads.

Figure 1B:
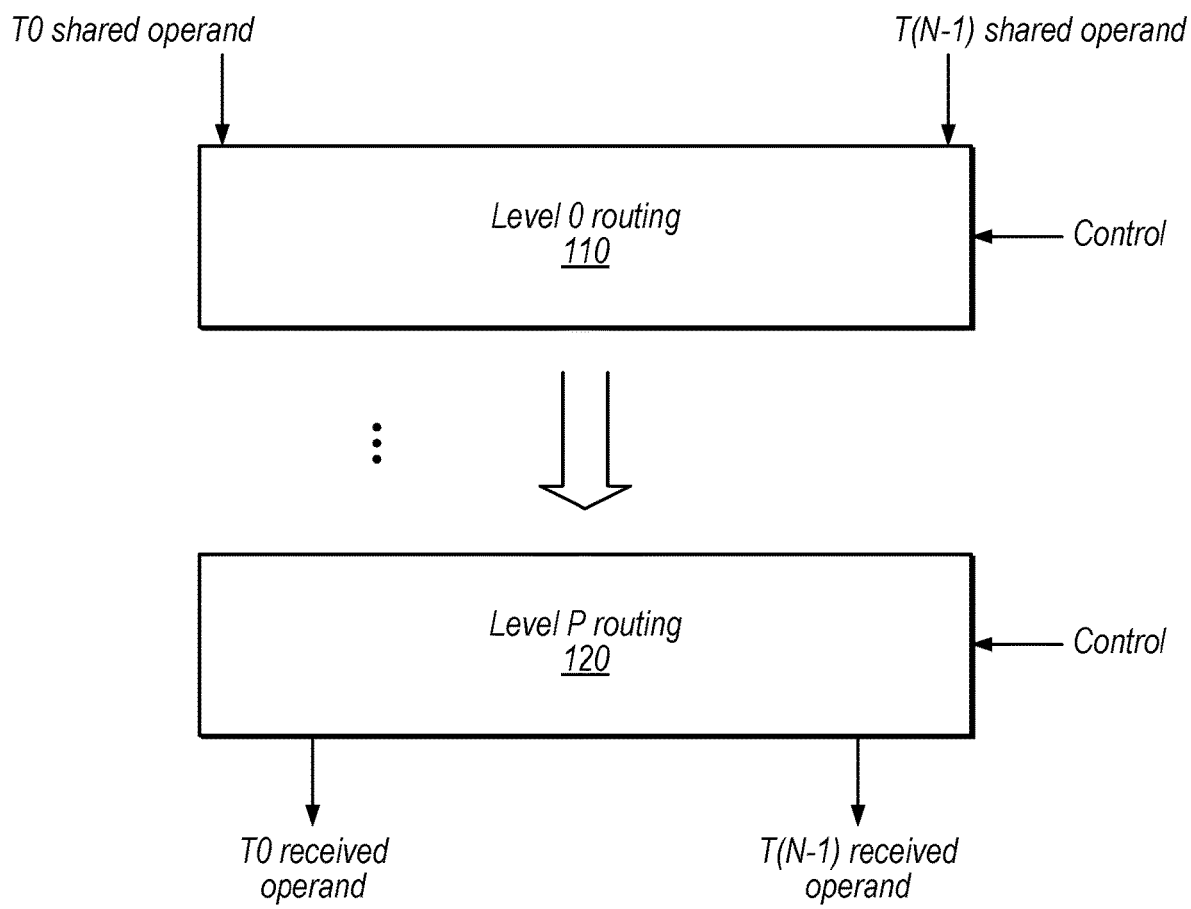
FIG. 1B is a block diagram illustrating multi-level routing circuitry that does not support full permutation, according to some embodiments.

FIG. 1B is a block diagram illustrating example hierarchical routing circuitry, according to some embodiments. As shown, the routing circuitry may include any appropriate number of levels, including as few as two levels. In the illustrated example, the routing circuitry receives operands to be shared from N threads T0 through T(N−1) and outputs received operands for each of these threads.

In the illustrated embodiment, the routing circuitry includes P levels of routing circuitry, including level 0 110 and level P 120, which each receive respective control signals (e.g., based on the instruction being executed). In various embodiments, operands enter an input level of the routing circuitry and exit a final level of the routing circuitry. As used herein, a "prior" level of the routing circuitry refers to a level that is closer to the input level. For example, level 0 is the input level and is thus prior to level P in the illustrated embodiment. The level P routing elements 120, in the illustrated embodiment, output received operands for the N SIMD threads.

The routing circuitry of FIG. 1B may not support full permutations of inputs. One or more levels, however, may implement a full permutation within respective subsets of their input operands.

Figure 1C:
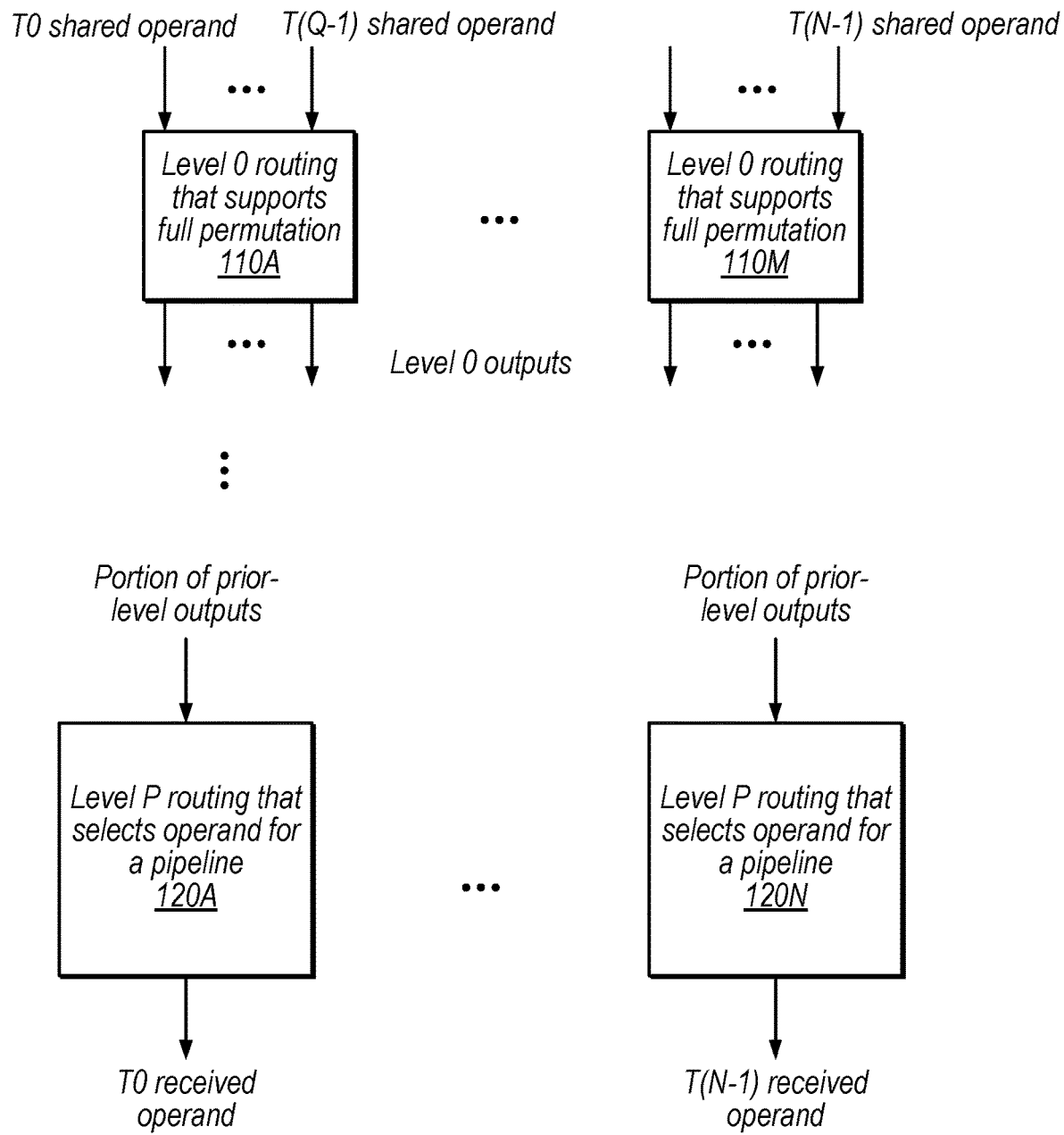
FIG. 1C is a block diagram illustrating multi-level routing circuitry that includes a level that support full permutation among subsets of inputs and a selection level that selects outputs, according to some embodiments.

FIG. 1C is a block diagram illustrating multi-level routing circuitry that includes a level that support full permutation among subsets of inputs and a selection level that selects outputs, according to some embodiments. FIG. 1C is one example of the circuitry of FIG. 1B. In the illustrated example, the level 0 routing circuitry 110 includes multiple elements 110A-110M that each support full permutation among a subset of the inputs to level 0. For example, circuit element 110A supports full permutation among threads T0 through T(Q−1). Note that, although shown as the input level in this example, a level that supports full permutation among subsets of inputs may be included at any appropriate level, in other embodiments. In some embodiments, each circuit element 110 has the same number of inputs and outputs.

The level P routing circuitry, in the illustrated example, includes a selection circuit element configured to select from a portion of the prior-level outputs (e.g., from level 0 or an intermediate level) to provide an operand for a particular thread. For example, selection element 120A receives a portion of the prior level outputs to select an operand for thread T0. As one example, elements 110 may be implemented using crossbars while elements 120 may be implemented using multiplexers, as discussed in detail below with reference to FIG. 3.

Figure 2:
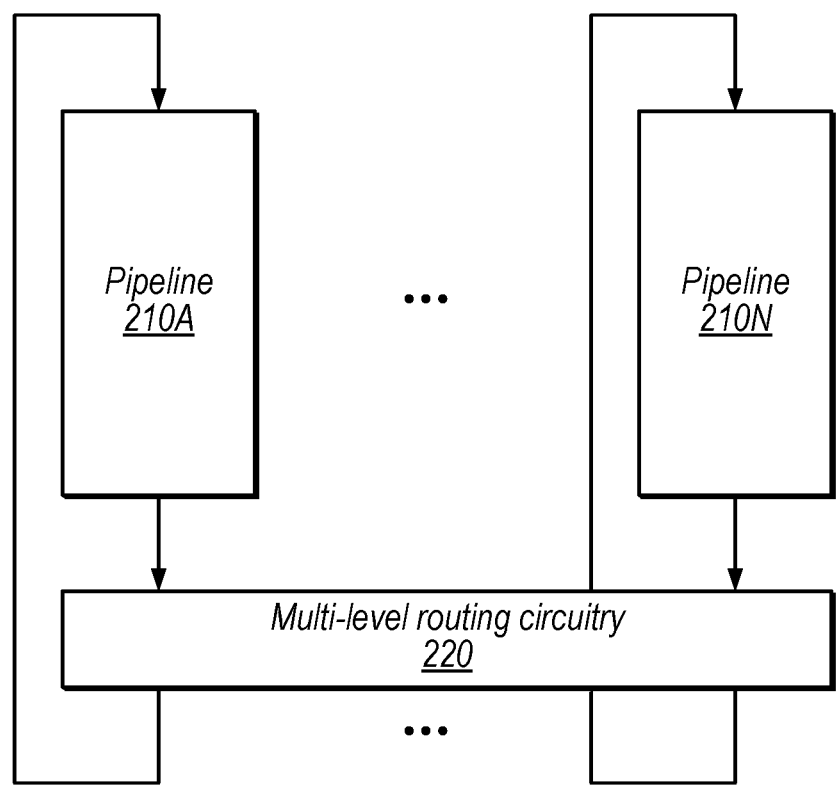
FIG. 2 is a block diagram illustrating example SIMD pipelines and hierarchical routing circuitry, according to some embodiments.

FIG. 2 is a block diagram illustrating example hardware SIMD pipelines and multi-level routing circuitry, according to some embodiments. In the illustrated embodiment, pipelines 210A-210N provides respective operands to the hierarchical routing circuitry 220, which routes the inputs to appropriate pipelines according to a specified supported permutation.

In the graphics context, pipelines 210 may be shader pipelines and may be configured to process graphics objects such as fragments or vertices or to execute more generic compute operations, e.g., as specified by a computer kernel. Each pipeline may include one or more fetch, decode, or execute stages, for example. Each pipeline may have associated storage in a register file (not shown separately) and may be associated with one or more lower-level operand caches. Although shown separately from the pipelines for purposes of illustration, the hierarchical routing circuitry may be included in one or more execution stages of the pipelines 210 and may perform certain instructions rather than other execution units. In some embodiments, hierarchical routing circuitry 220 receives inputs from thread-specific registers in a register file and outputs routed operands to other thread-specific registers in the register file. In other embodiments, hierarchical routing circuitry 220 may input or output operands at various locations, e.g., receiving execution unit outputs, providing forwarded result operands, accessing an operand cache, etc.

Note that different threads may be assigned to different pipelines at different times. For example, a first set of threads may execute using pipelines 210 and a second set of threads may execute using pipelines 210 once the first set of threads has finished execution. Further, portions of a SIMD group or threads from different SIMD groups may use different stages of pipelines 210 at the same time, e.g., using multi-threading. Further, while various examples are discussed in the context of a SIMD group, similar routing techniques may be used to permute various types of data in situations that may or may not involve SIMD processing.

Example Two-Level Routing Circuitry

Figure 3:
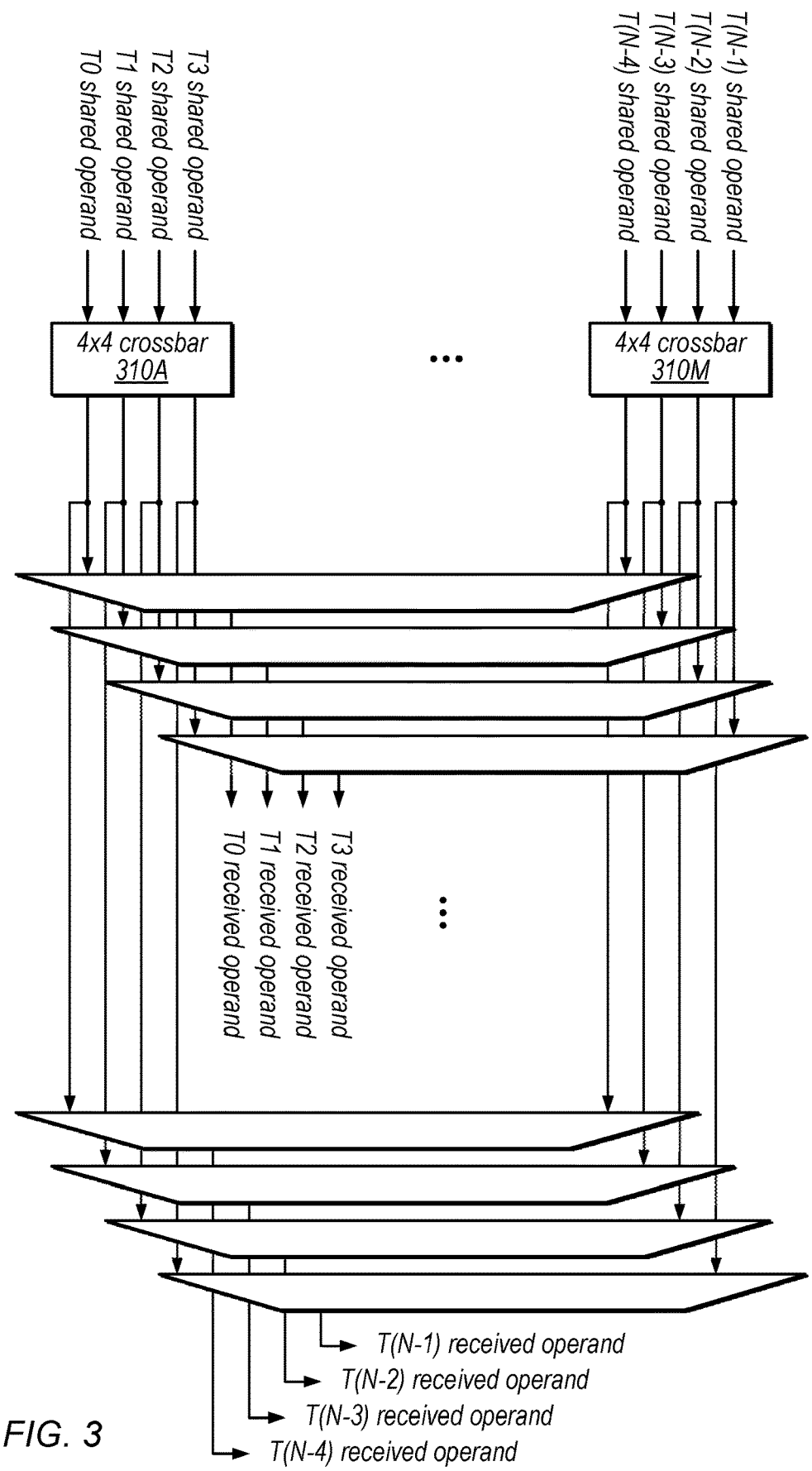
FIG. 3 is a block diagram illustrating example two-level routing circuitry with 4×4 crossbars at a first level and multiplexers at a second level, according to some embodiments.

FIG. 3 is a block diagram illustrating a specific example of two-level routing circuitry, according to some embodiments. In the illustrated embodiment, routing circuitry includes 4×4 crossbars 310A-310M and a multiplexer for each of the N threads. Similarly to FIGS. 1B and 1C, the illustrated routing circuitry is configured to receive operands for N threads and output operands for the N threads according to a specified permutation in a set of supported permutations.

Crossbar circuits 310, in the illustrated embodiment, are each configured to receive operands from a respective subset of pipelines to which a portion of the threads in a SIMD group are assigned and output the received operands based on a specified permute operation. In some embodiments, the crossbars 310 each support full permutation within their respective subset of operands. In some embodiments, the threads input to a given 4×4 crossbar are four threads that process a 2×2 quad of pixels. This may allow full permutation among operands for a given quad, in various embodiments. Note that in other embodiments, full crossbars may be configured to receive operands for subsets of threads with any of various numbers of threads, such as 8, 16, 32, etc.

The multiplexers, in the illustrated embodiment, are each configured to receive a particular output from all of the crossbars and select one of the crossbars to provide operands for their subset of the threads. For example, the multiplexer configured to select a received operand for thread T0 receives the left-most output from each of the M crossbars 310. Similarly, the multiplexer configured to select a received operand for thread T1 receives the second-to-the-left-most output from each of the M crossbars 310, and so on. Thus, each multiplexer receives only a portion of the outputs from the crossbar level of the routing circuitry (one output from each crossbar, in this example) and selects one of the outputs for its corresponding thread. Note that the multiplexers may be separately controlled based on the permutation operation being performed (control signals not explicitly shown).

For an example with a 16-thread SIMD group size, four 4×4 crossbars may be implemented and each of 16 multiplexers may receive four inputs. For an example with a 32-thread SIMD group size, eight 4×4 crossbars may be implemented and each of 32 multiplexers may receive eight inputs. For an example with a 64-thread group size, sixteen 4×4 crossbars may be implemented and each of 64 multiplexers may receive sixteen inputs. Note that the number of inputs per multiplexer may vary based on the size of the crossbars 310 as well, in some embodiments. Further, in some embodiments, later levels may receive subsets of operands from prior levels, where the subsets have any appropriate size. For example, in the example of FIG. 3, each MUX may receive two or more operands from each crossbar, which may increase circuit area relative to the illustrated example but may also increase the number of supported permutations in one pass through the routing circuitry. For at least certain SIMD group sizes, the routing circuitry of FIG. 3 supports full permutation within at most four passes through the routing circuitry. More generally, in some embodiments, the disclosed routing circuitry is configured to perform an arbitrary SIMD-wide shuffle in as many cycles as the number N of inputs to each element of the first level of the routing circuitry, e.g., by iterating across each numbered input to a given element at the first level over N cycles and then selecting the desired output value for a thread when it becomes available.

In some embodiments, the disclosed routing circuitry supports various permute operations using one pass through the routing circuitry (which may be performed in a single cycle). Examples of such operations include shift, rotate, broadcast, or butterfly operations. Shift operations may shift operands by a specified number of threads and may shift in a specified value such as zero or one into vacated threads. In some embodiments, uniform shift amounts among the threads may be expected. Rotate operations may similarly shift a specified number of threads but may wrap around values from other threads of the SIMD group. Broadcast operations may send an operand from one thread to multiple (or all) other threads in a SIMD group. Butterfly operations may mirror all or a portion of a SIMD group (one example of a butterfly operations is discussed below with reference to FIG. 4B).

Example Two-Level Permutations

Figure 4A:
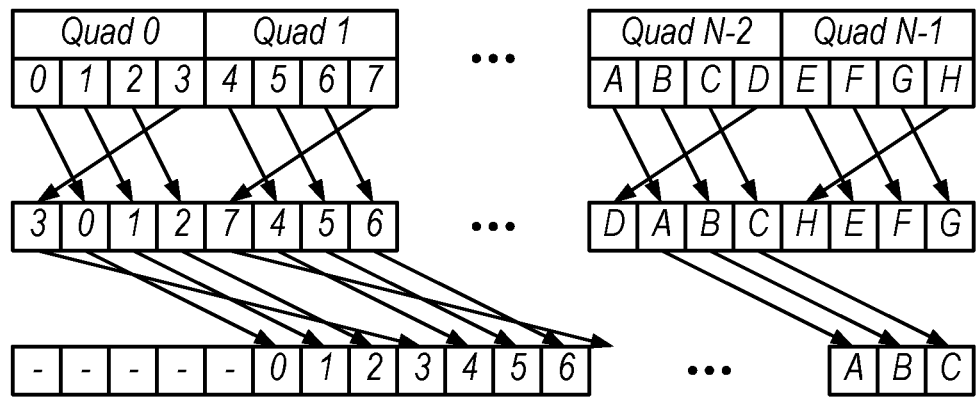
FIGS. 4A-4B illustrate example multi-level permutations for shift up and butterfly operations, according to some embodiments.
Figure 4B:
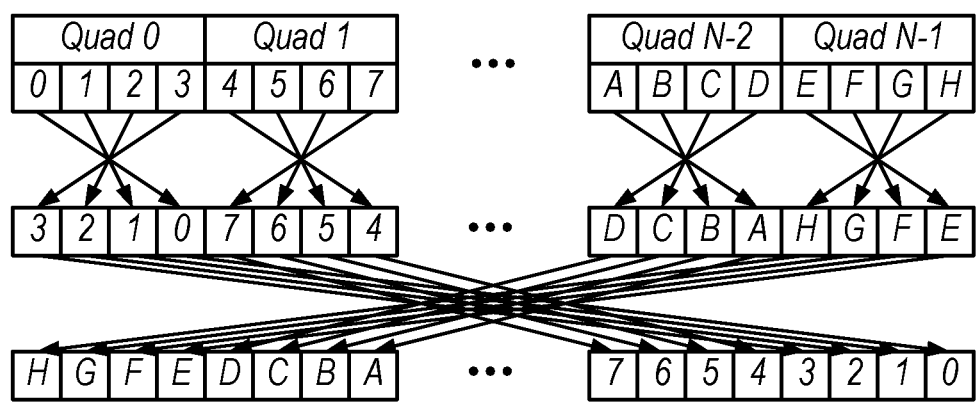

FIGS. 4A and 4B provide examples of routing that may be performed by the circuitry of FIG. 3. FIG. 4A is a diagram illustrating example two-level routing for an instruction that specifies to shift up by five, according to some embodiments. In the illustrated example, the routing circuitry receives operations for N quads (quads 0 through N−1). The operands shown for quads 0, 1, N−2, and N−1 are labeled 0-7 and A-H. Note that the disclosed techniques may be implemented with various numbers of quads, including more or less than the illustrated four quads.

As shown, the operands within each quad are rotated to the right by one at the first level. More generally, each thread may receive an operand for another thread according to the following equation: (the number of threads plus the index of the receiving thread minus the shift up amount) modulus 4. For example, the lanes of operands for quad 0 from left to right have operands 0, 1, 2, 3 before permutation and operands 3, 0, 1, 2 after the first-level permutation. Similarly, the lanes of operands for quad N−2 from left to right have operands A, B, C, D before permutation and operands D, A, B, C after the permutation.

At the second level, the multiplexers route threads to achieve the specified shift (e.g., the first thread from each quad is shifted right by eight and the remaining threads in each quad are shifted right by four). More generally, each thread may be routed to one of the four crossbar outputs according to the following equation: (thread index minus five)>>2. Therefore, the output of the multiplexers in the illustrated example achieves the specified shift by five to the right. Note that the "-" symbols for the first five threads indicate that the processor may shift appropriate fixed values in to vacated threads, such as zeros, ones, or their own source operand, in some embodiments.

FIG. 4B is a diagram illustrating example two-level routing for an instruction that specifies to butterfly by the number of threads minus one, according to some embodiments. In the illustrated embodiment, each quad is flipped at the crossbar level, e.g., where a receiving thread receives an operand from another thread according to the equation (thread index or receiving thread^(butterfly amount)) modulus 4. At the second level, in this example, the receiving thread receives an operand from another thread according to the equation (thread index of receiving thread^(butterfly amount))>>2.

For a broadcast operation, a crossbar may send one thread's operand to multiple (e.g., all) outputs of the crossbar and each multiplexer of FIG. 3 may select an output from that crossbar, e.g., such that the thread's operand is received by multiple threads of the SIMD group.

Note that in some embodiments, certain threads may not be active, e.g., due to a SIMD group that is not full, predicated execution, etc. In some embodiments, operands for invalid threads may be zeroed or threads that would normally receive operands from those threads may select their own operands instead.

Example Method

FIG. 5 is a flow diagram illustrating an example method for permuting operands using multi-level routing circuitry, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, hierarchical operand routing circuitry routes operands between ones of a set of single-instruction multiple-data (SIMD) pipelines based on a permute instruction. In the illustrated embodiment, this includes elements 520 and 530. In some embodiments, the hierarchical routing circuitry is configured to perform a set of permute operations within a single cycle, e.g., shift, rotate, butterfly, and broadcast operations. In some embodiments, the hierarchical routing circuitry supports full permutation of operands among the pipelines based on execution of at most a threshold number of permute instructions. The operands may be sourced from and delivered to thread-specific portions of a register file, for example, or any of various appropriate pipeline circuitry.

At 520, in the illustrated embodiment, each of multiple crossbar circuits in a first level of the hierarchical operand routing circuitry receives operands from a respective subset of the pipelines and outputs one or more of the received operands on multiple output lines based on the permute instruction, where the crossbar circuits each support full permutation of their inputs. In some embodiments, each subset of pipelines corresponding to a crossbar is configured to process a two by two quad of pixels and the crossbars are four by four crossbars.

At 530, in the illustrated embodiment, circuitry in a second level of the hierarchical operand routing circuitry selects an operand from a previous level for each of the pipelines, where the selection is from among only a portion of output operands from the previous level to provide an operand for a respective pipeline. In some embodiments, the circuitry in the second level includes a multiplexer for each thread configured to receive one operand from each of the crossbar circuits. Each multiplexer may have a number of inputs equal to the number of crossbar circuits, in these embodiments.

Example Device

Figure 6:
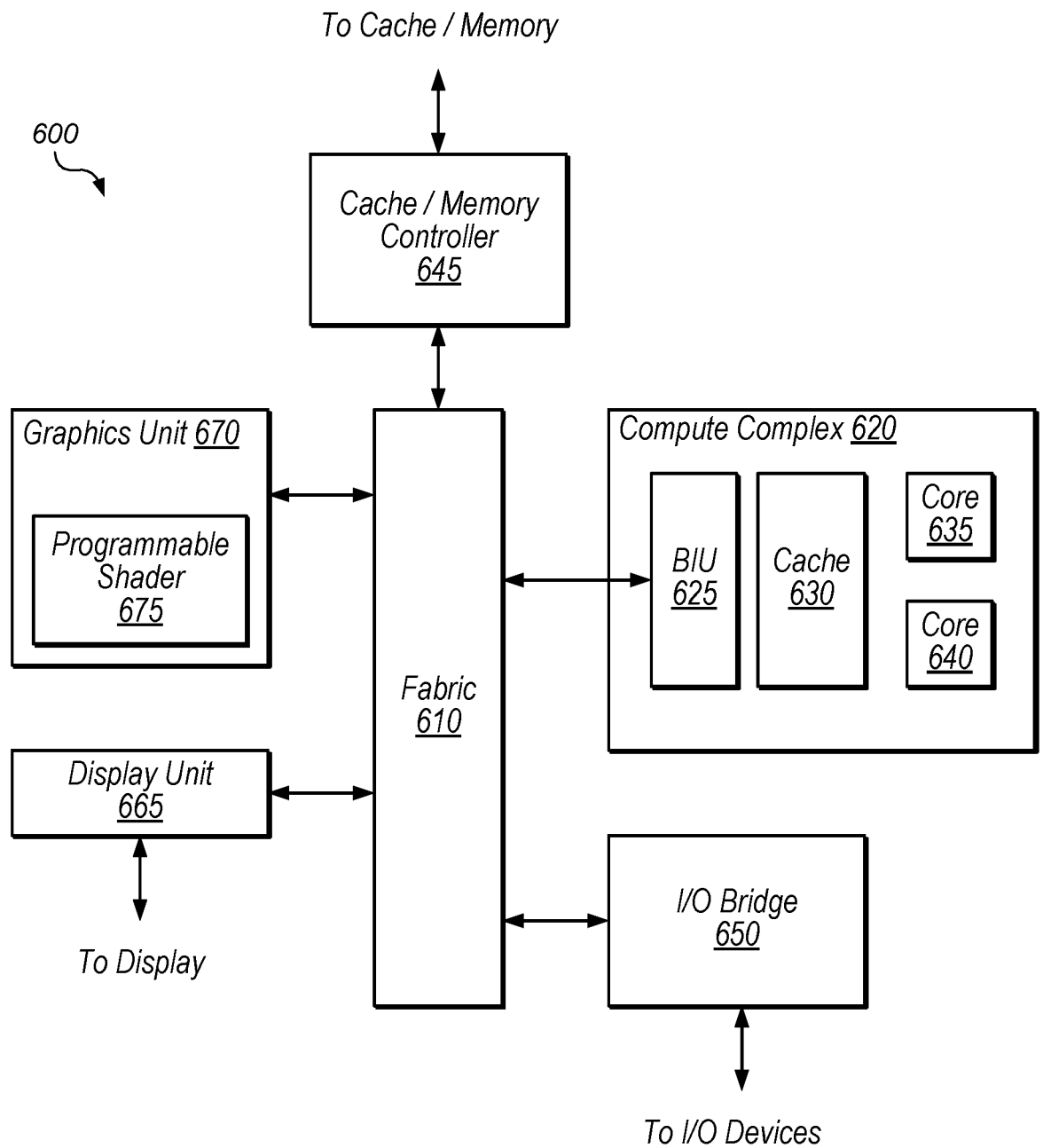
FIG. 6 is a block diagram illustrating an example computing device that may include SIMD pipelines, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 670, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 670 may be described as "coupled to" a memory through fabric 610 and cache/memory controller 645. In contrast, in the illustrated embodiment of FIG. 6, graphics unit 670 is "directly coupled" to fabric 610 because there are no intervening elements.

Graphics unit 670 may include one or more processors and/or one or more graphics processing units (GPU's). Graphics unit 670 may receive graphics-oriented instructions, such as OPENGL®, Metal, or DIRECT3D® instructions, for example. Graphics unit 670 may execute specialized GPU instructions or perform other operations based on the received graphics-oriented instructions. Graphics unit 670 may generally be configured to process large blocks of data in parallel and may build images in a frame buffer for output to a display. Graphics unit 670 may include transform, lighting, triangle, and/or rendering engines in one or more graphics processing pipelines. Graphics unit 670 may output pixel information for display images. Programmable shader 675, in various embodiments, may include highly parallel execution cores configured to execute graphics programs, which may include pixel tasks, vertex tasks, and compute tasks (which may or may not be graphics-related).

In some embodiments, programmable shader 675 includes the disclosed routing circuitry. Programmable shader 675 may include multiple copies of the disclosed routing circuitry, e.g., for different sets of pipelines configured to process different SIMD groups. In other embodiments, the disclosed routing circuitry may be used in various other contexts, e.g., within a CPU core, a display unit, etc.

Display unit 665 may be configured to read data from a frame buffer and provide a stream of pixel values for display.

Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
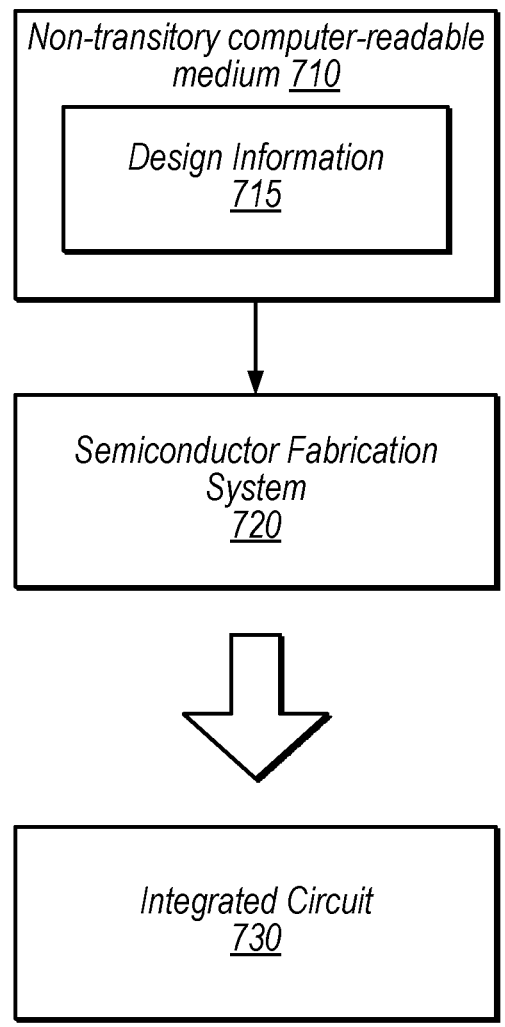
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1A-3, or 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
hierarchical operand routing circuitry configured to route, based on a permute instruction, operands between ones of a set of single-instruction multiple-data (SIMD) pipelines configured to execute a SIMD group, wherein the routing circuitry includes multiple levels including:
a first level that includes a set of multiple crossbar circuits, including:
a first crossbar circuit that supports full permutation of its inputs and is configured to receive operands from only a first subset of the set of pipelines that includes less than all of the pipelines in the set and output one or more of the received operands on multiple first output lines based on the permute instruction; and
a second crossbar circuit that supports full permutation of its inputs and is configured to receive operands from only a second subset of the set of pipelines that includes less than all of the pipelines in the set and output one or more of the received operands on multiple second output lines based on the permute instruction; and
a second level that includes multiplexer circuitry for one of the SIMD pipelines, wherein the multiplexer circuitry is configured to select an operand output from the first level as an input operand for the SIMD pipeline and is configured to receive only a portion of the first output lines and only a portion of the second output lines.

2. The apparatus of claim 1, wherein the first and second crossbar circuits are four by four crossbars.

3. The apparatus of claim 2, wherein the second level includes multiple multiplexers, wherein ones of the multiplexers are configured to receive an output from each of the crossbar circuits.

4. The apparatus of claim 1, further comprising:
wherein the multiplexer circuitry is configured to receive a single output line from the first crossbar circuit and a single output line from the second crossbar circuit.

5. The apparatus of claim 1, wherein the permute instruction is a shift instruction or a rotate instruction.

6. The apparatus of claim 1, wherein the permute instruction is a broadcast instruction, wherein the second level is configured to provide an operand from one pipeline to multiple other pipelines based on the broadcast instruction.

7. The apparatus of claim 1, wherein the permute instruction is a butterfly instruction.

8. The apparatus of claim 1, wherein the hierarchical operand routing circuitry supports full permutation of operands among the pipelines based on execution of at most a threshold number of permute instructions.

9. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
hierarchical operand routing circuitry configured to route, based on a permute instruction, operands between ones of a set of single-instruction multiple-data (SIMD) pipelines configured to execute a SIMD group, wherein the routing circuitry includes multiple levels including:
a first level that includes a set of multiple crossbar circuits, including:
a first crossbar circuit that supports full permutation of its inputs and is configured to receive operands from only a first subset of the set of pipelines that includes less than all of the pipelines in the set and output one or more of the received operands on multiple first output lines based on the permute instruction; and
a second crossbar circuit that supports full permutation of its inputs and is configured to receive operands from only a second subset of the set of pipelines that includes less than all of the pipelines in the set and output one or more of the received operands on multiple second output lines based on the permute instruction; and
a second level that includes multiplexer circuitry for one of the SIMD pipelines, wherein the multiplexer circuitry is configured to select an operand output from the first level as an input operand for the SIMD pipeline and is configured to receive only a portion of the first output lines and only a portion of the second output lines.

10. The non-transitory computer readable storage medium of claim 9, wherein the first and second crossbar circuits are four by four crossbars.

11. The non-transitory computer readable storage medium of claim 10, wherein the multiplexer circuitry is configured to receive a single output line from the first crossbar circuit and a single output line from the second crossbar circuit.

12. The non-transitory computer readable storage medium of claim 9, wherein the circuit further includes:
register file circuitry, wherein the register file circuitry includes thread-specific storage for ones of the pipelines and is configured to provide operands from the thread-specific storage to the first level of the hierarchical operand routing circuitry.

13. The non-transitory computer readable storage medium of claim 9, wherein the permute instruction is a shift instruction or a rotate instruction.

14. The non-transitory computer readable storage medium of claim 9, wherein the permute instruction is a broadcast instruction, wherein the second level is configured to provide an operand from one pipeline to multiple other pipelines based on the broadcast instruction.

15. The non-transitory computer readable storage medium of claim 9, wherein the permute instruction is a butterfly instruction.

16. The non-transitory computer readable storage medium of claim 9, wherein the hierarchical operand routing circuitry supports full permutation of operands among the pipelines based on execution of at most a threshold number of permute instructions.

17. A method, comprising:
routing, by hierarchical operand routing circuitry, operands between ones of a set of single-instruction multiple-data (SIMD) pipelines based on a permute instruction for a SIMD group, including:
receiving, by a first crossbar circuit supports full permutation of its inputs, operands from only a first subset of the set of pipelines that includes less than all of the pipelines in the set and outputting one or more of the received operands on multiple first output lines based on the permute instruction;
receiving, by a second crossbar circuit that supports permutation of its inputs, operands from only a second subset of the set of pipelines that includes less than all of the pipelines in the set and outputting one or more of the received operands on multiple second output lines based on the permute instruction, wherein the first and second crossbar circuits are at a first level of the hierarchical operand routing circuitry; and selecting, by multiplexer circuitry in a second level of the hierarchical operand routing circuitry for one of the SIMD pipelines, an operand output from the first level as an input operand for the SIMD pipeline based on receiving only a portion of the first output lines and only a portion of the second output lines.

18. The method of claim 17, wherein the first and second crossbar circuits are four by four crossbars.

19. The method of claim 17, wherein the multiplexer circuitry receives a single output line from the first crossbar circuit and a single output line from the second crossbar circuit.

20. The method of claim 17, wherein the permute instruction is one of: a shift instruction, a rotate instruction, a broadcast instruction, or a butterfly instruction.

* * * * *